(12) United States Patent
Strickland, Jr.

(10) Patent No.: US 12,735,873 B2
(45) Date of Patent: Sep. 15, 2026

(54) SYSTEMS AND METHODS FOR EXCAVATION

(71) Applicant: AzerGrade Innovations Inc, Whitesburg, GA (US)

(72) Inventor: Richard Strickland, Jr., Whitesburg, GA (US)

( * ) Notice: Subject to any disclaimer, the term of this patent is extended or adjusted under 35 U.S.C. 154(b) by 23 days.

(21) Appl. No.: 18/939,647

(22) Filed: Nov. 7, 2024

(65) Prior Publication Data

US 2026/0125879 A1 May 7, 2026

(51) Int. Cl.
*E02F 9/26* (2006.01)
*G01C 5/00* (2006.01)

(52) U.S. Cl.
CPC ................ *E02F 9/264* (2013.01); *G01C 5/00* (2013.01)

(58) Field of Classification Search
CPC .................................. E02F 9/264; G01C 5/00
See application file for complete search history.

(56) References Cited

U.S. PATENT DOCUMENTS

| | | | | |
|---|---|---|---|---|
| 4,945,221 | A | 7/1990 | Nielsen et al. | |
| 5,682,311 | A | 10/1997 | Clark | |
| 7,814,670 | B2 | 10/2010 | Katayama et al. | |
| 10,094,654 | B2 | 10/2018 | Crozier et al. | |
| 2001/0023766 | A1* | 9/2001 | Ohtomo | G05D 1/0272 701/50 |
| 2013/0151040 | A1* | 6/2013 | Allen | B64D 45/00 701/4 |
| 2018/0002899 | A1* | 1/2018 | Morimoto | E02F 3/43 |
| 2022/0172132 | A1* | 6/2022 | Fujita | H04W 4/029 |
| 2023/0160180 | A1* | 5/2023 | Vories | G01C 5/00 37/466 |
| 2025/0067024 | A1* | 2/2025 | Gorman | E02F 9/26 |

FOREIGN PATENT DOCUMENTS

| | | | |
|---|---|---|---|
| KR | 200382834 | Y1 | 4/2005 |

* cited by examiner

*Primary Examiner* — Tyler J Lee
*Assistant Examiner* — Matthew John Moscola
(74) *Attorney, Agent, or Firm* — Jeremy A. Briggs

(57) ABSTRACT

A construction equipment including an implement is disclosed. The construction equipment includes a laser reading unit removably mounted on a construction equipment body. The laser reading unit may read a laser signal projected by a laser projecting unit and establish a reference point. The reference point may be a point at which the laser reading unit reads the laser signal projected by the laser projecting unit. The construction equipment further includes an altimeter that may measure a height of the implement relative to the reference point. The altimeter may be a non-pressurized system that includes a fluid to measure the height of the implement relative to the reference point.

18 Claims, 5 Drawing Sheets

SYSTEMS AND METHODS FOR EXCAVATION

TECHNICAL FIELD

The present disclosure relates to construction equipment, and more particularly to systems and methods for excavation.

BACKGROUND

In the construction industry, it is crucial to measure trench excavation accurately (including the trench depth). A precise measurement ensures proper planning, effective utilization of resources, and a high standard of safety.

There exist different ways to measure trench depths. For instance, some operators use laser projectors and grade sticks (or grade rods) for establishing grades and reference points, which may enable the operator to measure the trench depth. The operator may position the laser projector and the grade stick in proximity to the excavator while performing the excavation operation. The laser projector may project a laser signal over a 360 degrees range along a horizontal axis of the laser projector. The grade stick may include a sliding laser reader that may read the laser signal projected by the laser projector to establish the reference point. The grade stick may include measuring scale markings along its length, which may enable the operator to measure the trench depth from the reference point.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
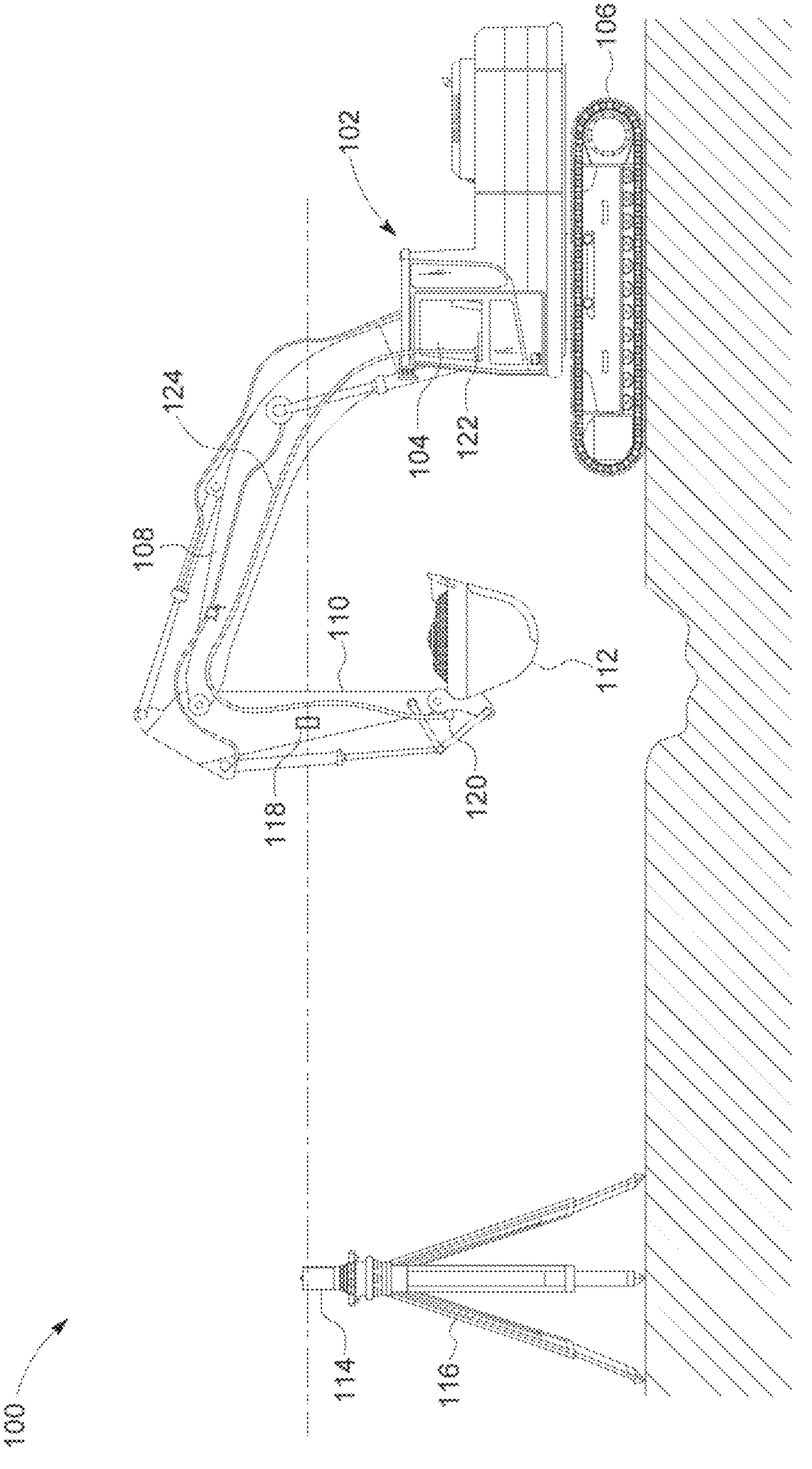
FIG. 1 depicts an environment in which techniques and structures for providing the systems and methods disclosed herein may be implemented.

The present disclosure is directed to a system and method that may assist an operator to precisely perform excavation to a required depth. The system may include a combination of a laser level and an altimeter, which may assist the operator to precisely perform the excavation via a construction equipment (e.g., an excavator or a backhoe). The construction equipment may include a plurality of components including, but not limited to, an implement (e.g., a blade or a bucket that contacts the ground), an arm, a boom, an operator cabin, tracks, etc. The arm may be located between the implement and the boom, and the boom may be attached to the cabin. The operator may use a control panel located inside the cabin to move the arm vertically upwards or downwards (e.g., away from or towards the ground).

The laser level may include a laser projecting unit or a laser transmitting unit that may project a laser signal (or a continuous laser beam) over a 360 degrees range along a horizontal axis of the laser projecting unit. The laser level may further include a laser reading unit that may read or pick up the laser signal projected by the laser projecting unit. The laser reading unit may be attached to a construction equipment body. In some aspects, the laser reading unit may be removably attached to the arm via a first magnet. The laser projecting unit may be positioned on the ground, in proximity to the construction equipment.

In some aspects, when the laser projecting unit may be projecting the laser signal, the operator may use the control panel located inside the cabin to move the arm vertically upwards or downwards. The arm movement may cause the vertical movement of the laser reading unit, which may enable the laser reading unit to read the laser signal projected by the laser projecting unit. When the laser reading unit reads the laser signal, the laser level may establish a reference point, which may enable the operator to ensure accuracy in leveling and alignment. In addition, the reference point may enable the operator to set and maintain a required depth for excavation, thereby ensuring that the ground is excavated evenly. In further aspects, the laser reading unit may generate an indication (e.g., an indication signal) when the laser reading unit reads the laser signal or when the reference point is established. In some aspects, the laser reading unit may provide the indication (e.g., audio or visual indication) to the operator when the laser reading unit reads the laser signal. Alternatively, the laser reading unit may transmit the indication signal to a controller associated with the system.

The altimeter may be connected to the construction equipment, and may measure the height of the implement in space relative to the reference point established using the laser level, which may assist the operator to precisely perform excavation to the required depth. The determination of the implement height may help the operator to decide how deep the implement should be while performing the digging operation. The altimeter may be a non-pressurized and closed system and may not get affected by barometric pressure. The altimeter may include a fluid, and the altimeter may measure the fluid weight to estimate/measure the height of the implement. In some aspects, the fluid may be oil (or mineral oil). Alternatively, the fluid may be water or any other liquid. The altimeter uses hydrostatic principles for accurate height measurements. In some aspects, the altimeter may include a resealable receptacle configured to store the fluid. The resealable receptacle may enable the operator to easily add or change the fluid inside the resealable receptacle (or the altimeter) in the field where the construction equipment may be performing the digging operation, during service or maintenance.

In some aspects, the altimeter may include a first altimeter part and a second altimeter part that may be connected via a tube. The first altimeter part may be positioned on an implement top outer surface, via a second magnet. The implement top surface may be opposite to an implement bottom surface that touches the ground/grade. In some aspects, the first altimeter part may include the resealable receptacle that stores the fluid. The operator may transfer the fluid from the resealable receptacle to the tube when required (e.g., during service or maintenance). The second altimeter part may be removably mounted inside the cabin via a third magnet. The second altimeter part may be or include a display device that may display the location/position of the implement relative to the reference point. The second altimeter part may display a relative altitude reading with respect to the reference point. In some aspects, the altimeter may determine the pressure generated due to the fluid weight in the tube to detect the implement position, and display the implement position relative to the reference point.

In some aspects, the second altimeter part may include a plurality of buttons that may enable the operator to operate the altimeter, and a display screen that displays the location of the implement relative to the reference point. The plurality of buttons may include a calibration button that may enable the operator to perform manual calibration of the altimeter at the reference point. Once the second altimeter part may be calibrated at the reference point, the second altimeter part may display the height/location of the implement relative to the reference point on the display screen. In further aspects, the controller may automatically calibrate the altimeter (e.g., the second altimeter part) to zero when the laser reading unit reads the laser signal projected by the laser projecting unit. In this case, the controller may receive the indication of the reference point from the laser reading unit and may automatically calibrate the altimeter based on the reference point.

The present disclosure discloses a system that may assist the operator to know the location of the implement relative to the reference point, while sitting in the construction equipment cabin, and accordingly operate the construction equipment to precisely perform the excavation to the required depth.

These and other advantages of the present disclosure are provided in detail herein.

ILLUSTRATIVE EMBODIMENTS

The disclosure will be described more fully hereinafter with reference to the accompanying drawings, in which example embodiments of the disclosure are shown, and not intended to be limiting.

Figure 2:
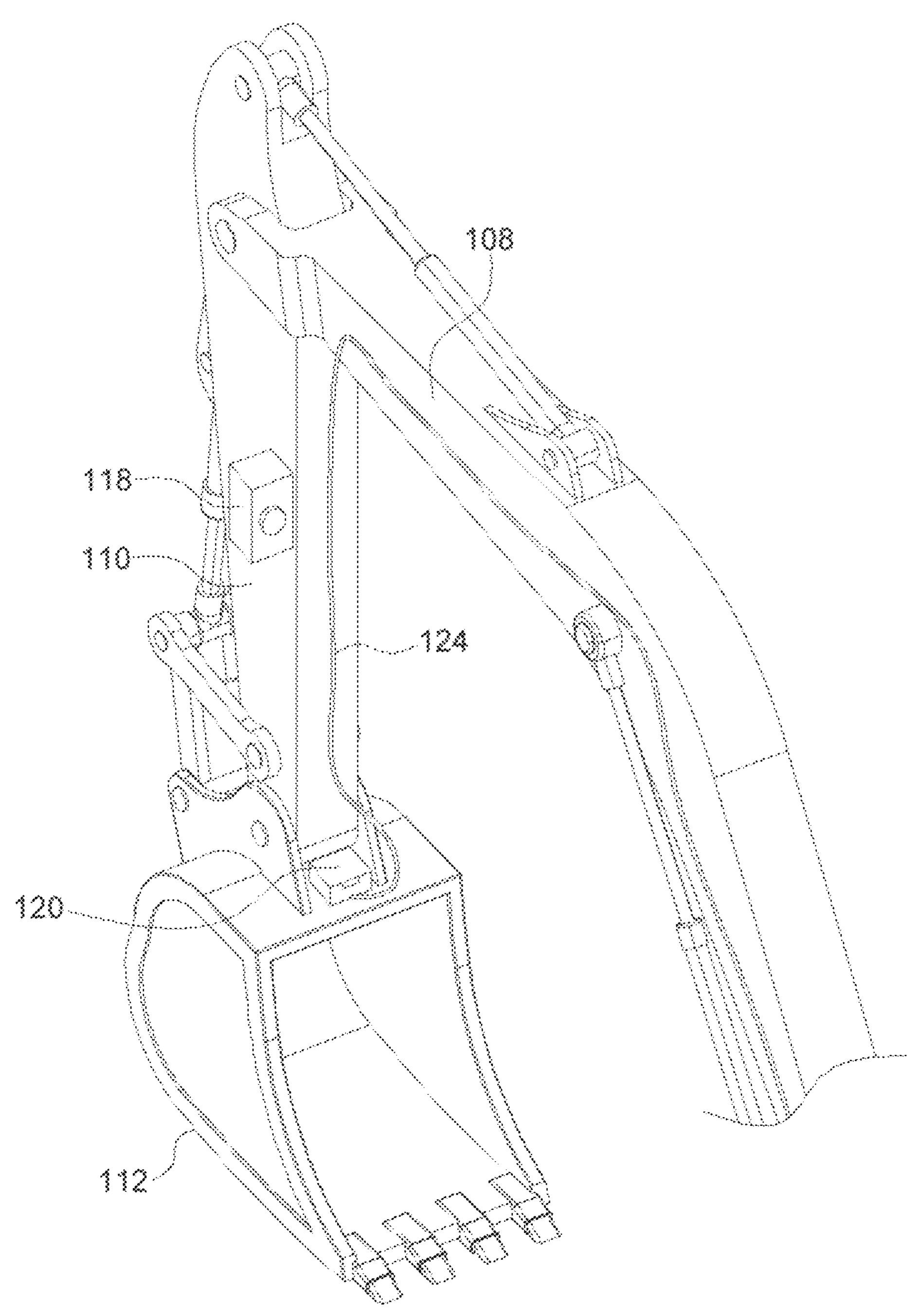
FIG. 2 depicts a view of an arm having a laser reading unit, and a bucket of a construction equipment in accordance with the present disclosure.

FIG. 1 depicts an environment 100 in which techniques and structures for providing the systems and methods disclosed herein may be implemented. FIG. 1 will be described in conjunction with FIGS. 2, 3, and 4.

The environment 100 may include a construction equipment 102 that may perform digging operations. The construction equipment 102 may be, for example, an excavator, a backhoe, and/or the like. The construction equipment 102 may include a plurality of components including, but not limited to, a cabin 104, tracks 106, a boom 108, an arm 110, and an implement 112. The cabin 104 may be an operator's cabin. The operator may sit inside the cabin 104 and operate the construction equipment 102. In some aspects, the cabin 104 may be rotating cabin that may rotate 360 degrees. The cabin 104 may include a control panel (not shown) that may enable the operator to operate the construction equipment 102. The control panel may include joysticks and other components that the operator may use to operate the construction equipment 102.

The tracks 106 may be rubber or steel tracks that may enable the construction equipment 102 to move (e.g., from a first location to a second location). The boom 108 may be a horizontal structure that extends outward from excavator's chassis. The boom 108 may be disposed parallel or substantially parallel to the ground surface when the operator operates the construction equipment 102 for the digging operations. The arm 110 may be connected to an end (e.g., a distal end) of the boom 108 and may extend downward towards the ground surface. One end of the arm 110 (e.g., an arm proximal end) may be connected to the boom 108 and another end (e.g., an arm distal end) may be connected to the implement 112. The implement 112 may be a bucket or a blade, which may be used for digging and collecting soil, debris, etc. during the digging operations. The implement 112 may be of any size and type based on the digging operation requirements.

The environment 100 may further include a laser level (e.g., a rotary laser level) that the operator may use to produce a highly accurate horizontal levelling line. The operator may use the laser level for establishing grades and reference points (e.g., a horizontal reference point) across a surface, which may enable the operator to ensure accuracy in leveling and alignment. The reference point may provide a reference for leveling and alignment. The reference point may enable the operator to set and maintain a required depth for excavation, thereby ensuring that the ground is excavated evenly.

The laser level may include a laser projecting unit 114 that may project/transmit a laser signal (or a laser beam) over a 360 degrees range along a horizontal axis of the laser projecting unit 114. The horizontal axis, as described in the present disclosure, may mean an axis that is parallel to the ground surface. The laser projecting unit 114 may be mounted on a tripod 116 (or any other similar structure). The laser projecting unit 114 may transmit or project a continuous laser beam in a horizontal plane parallel to the ground surface.

The laser level may further include a laser reading unit 118 (shown in FIGS. 1 and 2) that may read the laser signal projected by the laser projecting unit 114, to establish the reference point. The laser reading unit 118 may pick/receive the laser signal transmitted by the laser projecting unit 114 when the laser reading unit 118 may be horizontally aligned with the laser projecting unit 114. The reference point may be a point at which the laser reading unit 118 reads the laser signal projected by the laser projecting unit 114, which may act as the reference for leveling and alignment. In some aspects, the laser reading unit 118 may include a photosensor that may detect the laser signal or the laser beam projected by the laser projecting unit 114, when the laser reading unit 118 intercepts the laser signal or the laser beam projected by the laser projecting unit 114.

In some aspects, the laser reading unit 118 may be mounted on the arm 110 (or any other construction equipment component) that may move vertically up and down, e.g., towards the ground or away from the ground. In some aspects, the laser reading unit 118 may be removably mounted on the arm 110 by using a first magnet (not shown). Stated another way, the laser reading unit 118 may be magnetically coupled with the metallic body of the arm 110. In other aspects, the laser reading unit 118 may be removably mounted on the arm 110 by using one or more fasteners (e.g., screws, nuts, bolts, etc.).

The laser projecting unit 114 may be positioned on the ground, in proximity to the construction equipment 102. Stated another way, the laser projecting unit 114 may not be a part of the construction equipment 102. The reference point may be established when the laser reading unit 118 reads the laser signal projected by the laser projecting unit 114. In some aspects, the reference point may be established when the operator moves the arm 110 vertically up or down and when the laser reading unit 118 gets horizontally aligned with the laser projecting unit 114.

In operation, when the laser projecting unit 114 is projecting the laser signal, the operator may use the control panel located inside the cabin 104 to move the arm 110 vertically upwards or downwards relative to the ground surface. The arm movement may cause vertical movement of the laser reading unit 118 (since the laser reading unit 118 is mounted on the arm 110, as described above), which may enable the laser reading unit 118 to read the laser signal projected by the laser projecting unit 114. When the laser reading unit 118 reads the laser signal, the laser level may establish the reference point.

In some aspects, when the laser reading unit 118 reads the laser signal, the laser reading unit 118 may generate and provide an indication to the operator. In some aspects, the laser reading unit 118 may provide a visual indication to the operator (e.g., via a light emitting device included in the laser reading unit 118). In further aspects, the laser reading unit 118 may provide an audio indication to the operator (e.g., via a buzzer or a speaker included in the laser reading unit 118). Such indicators may enable the operator to determine that the reference point is established.

In further aspects, the laser reading unit 118 may communicatively couple with a controller 402 (shown in FIG. 4), and may transmit the indication (as a command signal) associated with the reference point to the controller 402. In some aspects, the laser reading unit 118 may communicatively couple with the controller 402 through wires. Alternatively, the laser reading unit 118 may communicatively couple with the controller 402 via a network.

The network, as described herein, illustrates an example communication infrastructure in which the connected devices discussed in various embodiments of this disclosure may communicate. The network may be and/or include the Internet, a private network, public network or other configuration that operates using any one or more known communication protocols such as transmission control protocol/Internet protocol (TCP/IP), Bluetooth®, Bluetooth® Low Energy (BLE), Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

In further aspects, the environment 100 may include an altimeter that may measure a height of the implement 112 relative to the reference point, and output/display the measured height. The determination of the implement height may help the operator to decide how deep the implement 112 should be while performing the digging operation. The altimeter may be mounted on the construction equipment 102. In some aspects, the altimeter may be removably mounted on the construction equipment 102. In an exemplary aspect, the altimeter may be removably mounted on the construction equipment 102 via a second magnet.

The altimeter may communicatively couple with the controller 402 (and/or the laser reading unit 118). In some aspects, the altimeter may communicatively couple with the controller 402 through wires. Alternatively, the altimeter may communicatively couple with the controller 402 via the network described above.

The altimeter may be a non-pressurized and closed system and may not get affected by barometric pressure. The altimeter may include a fluid and may measure the fluid weight to estimate/measure the height of the implement 112 in space relative to the reference point established by using the laser level. In some aspects, the fluid may be oil (e.g., mineral oil) that may enable the altimeter to accurately measure the implement's height. Alternatively, the fluid may be water or any other liquid.

The altimeter may use hydrostatic principles for accurate height measurement. In some aspects, the altimeter may determine the pressure at any point in the fluid due to the fluid weight, and based on the determined pressure, the altimeter may estimate/identify the position of the implement 112 in the space relative to the reference point established by the laser level. In an exemplary aspect, the altimeter may include a pressure sensor to accurately determine the pressure described above. In additional aspects, the altimeter may include any other sensor to accurately detect the implement position in the space.

In some aspects, the altimeter may include a resealable receptacle 302 (shown in FIG. 3) that may store the fluid. The resealable receptacle 302 may move between an open state and a closed state. The resealable receptacle 302 may enable the fluid to be securely stored inside the resealable receptacle 302 during normal operation, in the closed state. In addition, the resealable receptacle 302 may enable the operator to move the resealable receptacle 302 from the closed state to the open state to easily add or change the fluid inside the resealable receptacle 302 during service or maintenance. The operator may easily open the resealable receptacle 302 to access a resealable receptacle interior portion to repair/service the altimeter in the field, without sending the altimeter to a factory for factory calibration. In an exemplary aspect, the resealable receptacle 302 may be a zip-lock bag that stores the fluid. The zip-lock bag may be positioned inside a plastic body. When the altimeter is damaged or not working properly, the operator may easily access the zip-lock bag interior portion and add or change the fluid in the field (where the construction equipment 102 may be operating).

Figure 3:
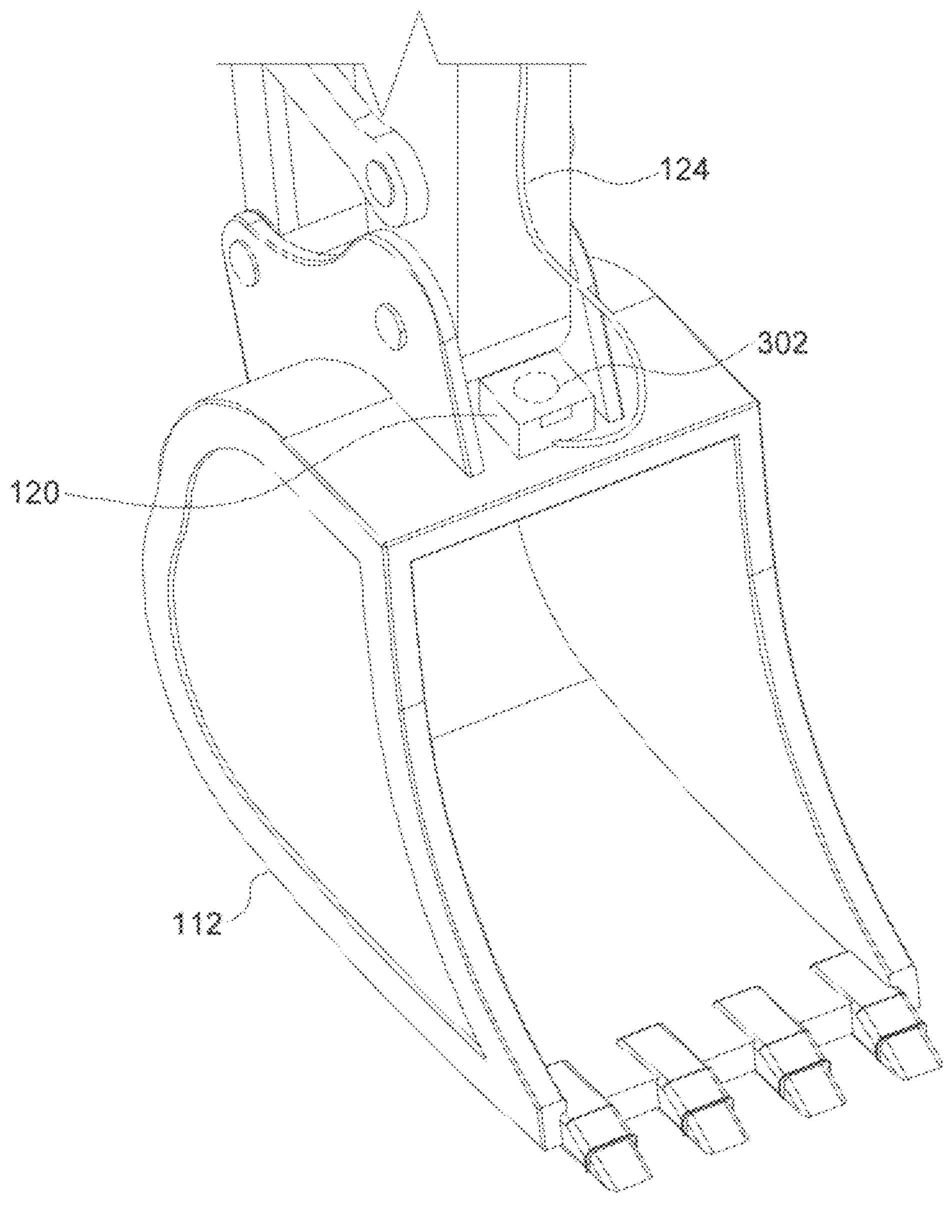
FIG. 3 depicts a view of a first altimeter part located at an implement in accordance with the present disclosure.

The altimeter may include a plurality of components including, but not limited to, a first altimeter part 120, a second altimeter part 122 and a tube 124 connecting the first altimeter part 120 and the second altimeter part 122 (as shown in FIGS. 1 and 3). In some aspects, the tube 124 may be removably connected to first altimeter part 120 and the second altimeter part 122. For instance, the tube 124 may be connected to the first altimeter part 120 and the second altimeter part 122 by using hose clamps. In some aspects, the first altimeter part 120 may be located/mounted at a first position in the construction equipment 102, and the second altimeter part 122 may be located/mounted at a second position in the construction equipment 102. The first position may be different from the second position. In an exemplary aspect, the first position may be the implement 112 and the second position may be the cabin 104.

The first altimeter part 120 may be removably mounted on the implement 112 via a third magnet. In an exemplary aspect, the first altimeter part 120 may be located on an implement top surface (as shown in FIG. 3). The implement top surface may be opposite to an implement bottom surface that touches the ground when the implement 112 excavates the ground. Further, the first altimeter part 120 may be located at an implement outer surface so that the first altimeter part 120 may not interfere with the implement interior portion during the digging operation.

The second altimeter part 122 may be removably mounted inside the cabin 104 via a fourth magnet. In some aspects, the second altimeter part 122 may be or include a display device that may display the location/position of the implement 112 relative to the reference point. The tube 124 may connect the first altimeter part 120 and the second altimeter part 122. In some aspects, the tube 124 may travel along the arm 110 and the boom 108 via a fifth magnet(s), adjacent to hydraulic hoses associated with the construction equipment 102, as shown in FIG. 1.

In some aspects, the first altimeter part 120 may include the resealable receptacle 302, as shown in FIG. 3. As mentioned above, the resealable receptacle 302 may store the fluid. The resealable receptacle 302 may supply the fluid into the tube 124 when required (e.g., during service or maintenance). The tube 124 may receive the fluid and store the fluid. The altimeter may then determine the pressure generated due to the fluid weight in the tube 124 to detect the implement position in the space relative to the reference point. Thus, the fluid inside the tube 124 may act as a measurement medium, which enables the altimeter to detect the implement position. In some aspects, the first altimeter part 120 may include a pump (not shown) that may pump the fluid from the resealable receptacle 302 to the tube 124. In addition, the first altimeter part 120 may include a mechanism (e.g., a valve mechanism) that may prevent the fluid to flow back from the tube 124 to the resealable receptacle 302.

Figure 4:
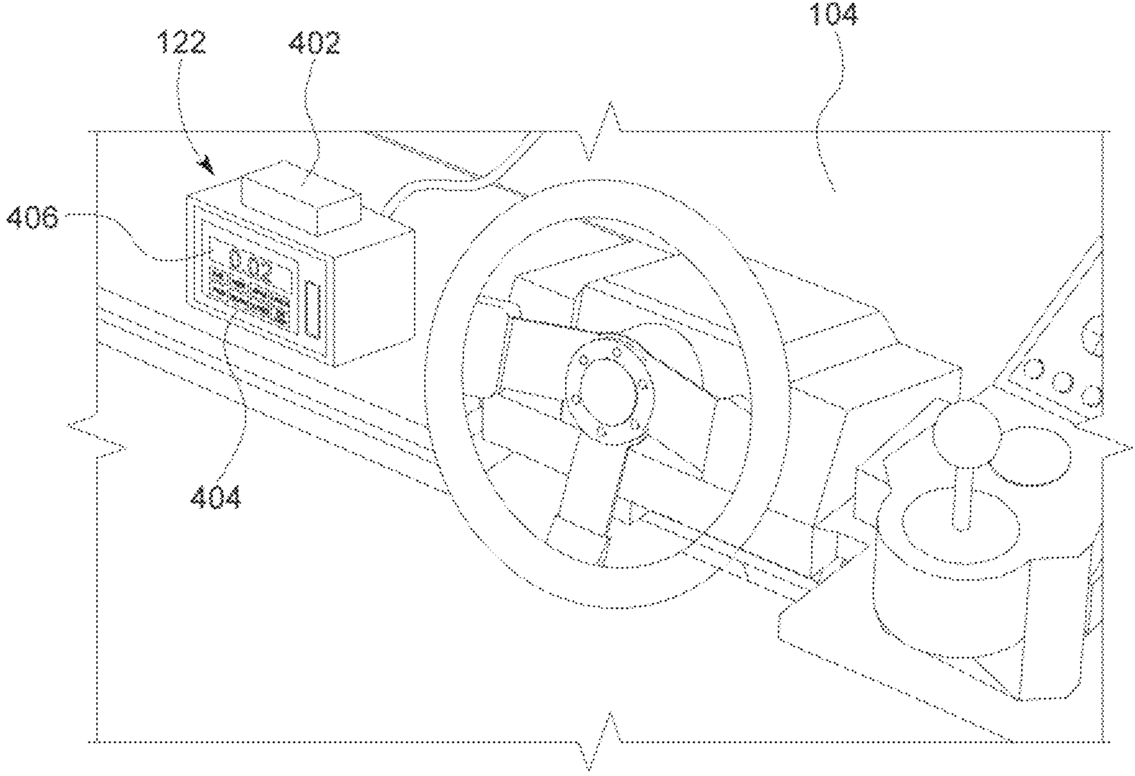
FIG. 4 depicts a view of a second altimeter part in accordance with the present disclosure.

In some aspects, the second altimeter part 122 may include a plurality of buttons 404 (as shown in FIG. 4) that may enable the operator to operate the altimeter, and a display screen 406 that displays the location of the implement 112 relative to the reference point that the altimeter measures. In some aspects, the plurality of buttons 404 may include a calibration button that may enable the operator to perform manual calibration of the altimeter to zero at the reference point. For instance, the operator may manually calibrate the second altimeter part 122 when the operator receives the visual/audio indication from the laser reading unit 118, which indicates the reference point. Once the second altimeter part 122 is calibrated at the reference point, the second altimeter part 122 may display the height/location of the implement 112 relative to the reference point when the operator moves the implement 112 vertically upwards or downwards (e.g., towards the ground or away from the ground), to determine the depth for excavation. For example, when the operator moves the implement 112 down by one inch from the reference point, the second altimeter part 122 may display "minus 1 inch" reading on the display screen 406. In this manner, the operator may view the reading on the display screen 406 to know the implement position, and may accurately or precisely perform the digging operation to the required depth.

In further aspects, the second altimeter part 122 (or the display device) may be communicatively coupled with the controller 402, as shown in FIG. 4. The controller 402 may automatically calibrate the altimeter (e.g., the second altimeter part 122) to zero, when the laser reading unit 118 reads the laser signal projected by the laser projecting unit 114. In this case, the controller 402 may receive the indication of the reference point/command signal from the laser reading unit 118 and may automatically calibrate the altimeter to zero when the reference point is established.

In additional aspects, the controller 402 may receive a required trench depth from the operator, correlate the required trench depth with the reference point, and provide instructions to the operator to move the implement 112 such that the implement 112 (or the construction equipment 102) digs the trench to the required depth. In alternative aspects, the controller 402 may automatically control the implement movement based on the required trench depth relative to the reference point, to precisely perform the digging operation.

Figure 5:
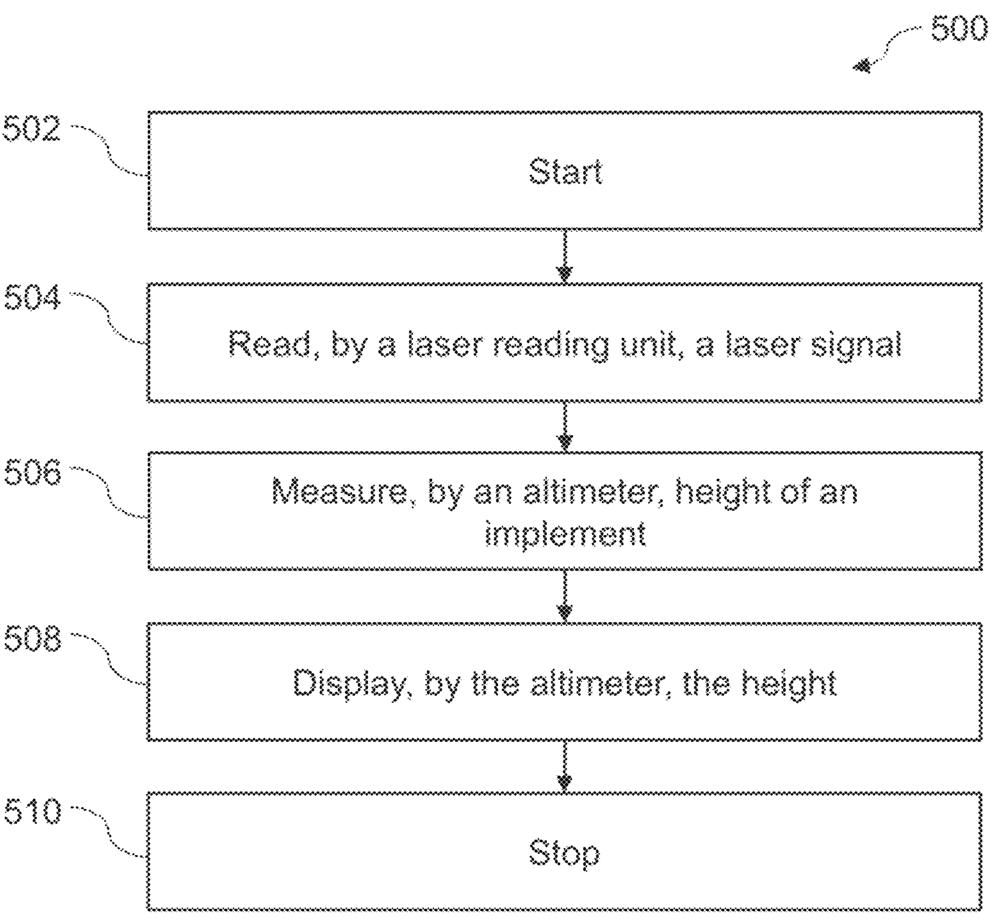
FIG. 5 depicts a flow diagram of an example method to perform excavation measurements in accordance with the present disclosure.

FIG. 5 depicts a flow diagram of an example method 500 to perform excavation measurements in accordance with the present disclosure. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 500 starts at step 502. At step 504, the method 500 includes reading, by the laser reading unit 118, the laser signal projected by the laser projecting unit 114 to establish the reference point. As described above, the reference point may be established when the laser reading unit 118 reads the laser signal projected by the laser projecting unit 114. In some aspects, the reference point may be established when the operator moves the arm 110 vertically and when the laser reading unit 118 is horizontally aligned with the laser projecting unit 114.

At step 506, the method 500 may include measuring, by the altimeter, the height of the implement 112 relative to the reference point. At step 508, the method 500 may further include displaying, by the altimeter, the measured height on the display screen 406. The operator may view the measured height and may accordingly perform the digging operation (e.g., dig the trench to the required depth).

The method 500 stops at step 510.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A construction equipment comprising:

an implement;

a laser reading unit removably mounted on a construction equipment body, wherein the laser reading unit is configured to read a laser signal projected by a laser projecting unit to establish a reference point, and wherein the reference point is a point at which the laser reading unit reads the laser signal projected by the laser projecting unit;

an altimeter configured to measure a height of the implement relative to the reference point, wherein the altimeter is a non-pressurized system that comprises a fluid to measure the height of the implement relative to the reference point, and wherein the altimeter is configured to measure a fluid weight to measure the height of the implement relative to the reference point established by the laser reading unit; and a controller configured to calibrate the altimeter to zero when the laser reading unit reads the laser signal projected by the laser projecting unit.

2. The construction equipment of claim 1, wherein the laser projecting unit is configured to project the laser signal over a 360 degrees range along a horizontal axis of the laser projecting unit, and wherein the horizontal axis is parallel to ground.

3. The construction equipment of claim 1, wherein the laser projecting unit is positioned on ground in proximity to the construction equipment.

4. The construction equipment of claim 1, wherein the laser reading unit is mounted on an arm of the construction equipment, wherein the arm is connected to the implement.

5. The construction equipment of claim 1, wherein the laser reading unit is removably mounted on the construction equipment via a first magnet.

6. The construction equipment of claim 1, wherein the laser reading unit is configured to generate an indication when the laser reading unit reads the laser signal.

7. The construction equipment of claim 1, wherein the fluid is oil.

8. The construction equipment of claim 1, wherein the altimeter comprises a resealable receptacle configured to store the fluid, which facilitates addition or replacement of the fluid inside the resealable receptacle, and wherein the resealable receptacle is a zip-lock bag that stores the fluid.

9. The construction equipment of claim 1, wherein the altimeter comprises a first altimeter part and a second altimeter part, and wherein first altimeter part and the second altimeter part are connected via a tube.

10. The construction equipment of claim 9, wherein the first altimeter part is mounted at a first position in the construction equipment and the second altimeter part is mounted at a second position in the construction equipment.

11. The construction equipment of claim 10, wherein the first altimeter part is mounted on the implement.

12. The construction equipment of claim 11, wherein the first altimeter part is mounted on the implement via a second magnet.

13. The construction equipment of claim 10, wherein the second altimeter part is mounted on a rotating cabin of the construction equipment.

14. The construction equipment of claim 13, wherein the second altimeter part is mounted on the rotating cabin via a third magnet.

15. The construction equipment of claim 13, wherein the second altimeter part comprises a display device.

16. The construction equipment of claim 1, wherein the implement comprises a bucket or a blade.

17. A system comprising:

a laser projecting unit configured to project a laser signal;

a laser reading unit removably mounted on a construction equipment body, wherein the laser reading unit is configured to read the laser signal projected by the laser projecting unit to establish a reference point, and wherein the reference point is a point at which the laser reading unit reads the laser signal projected by the laser projecting unit;

an altimeter configured to measure a height of an implement of a construction equipment relative to the reference point, wherein the altimeter is a non-pressurized system that comprises a fluid to measure the height of the implement relative to the reference point, and wherein the altimeter is configured to measure a fluid weight to measure the height of the implement relative to the reference point established by the laser reading unit; and a controller configured to calibrate the altimeter to zero when the laser reading unit reads the laser signal projected by the laser projecting unit.

18. A method comprising:

reading, by a laser reading unit, a laser signal projected by a laser projecting unit, wherein the laser reading unit is removably mounted on a construction equipment body, wherein the laser reading unit is configured to read the laser signal to establish a reference point, and wherein the reference point is a point at which the laser reading unit reads the laser signal projected by the laser projecting unit;

measuring, by an altimeter, a height of an implement of a construction equipment relative to the reference point, wherein the altimeter is a non-pressurized system that comprises a fluid to measure the height of the implement relative to the reference point, and wherein the altimeter is configured to measure a fluid weight to measure the height of the implement relative to the reference point established by the laser reading unit; and displaying, by the altimeter, the height on a display screen of the altimeter.

* * * * *